United States Patent Office 3,472,576
Patented Oct. 14, 1969

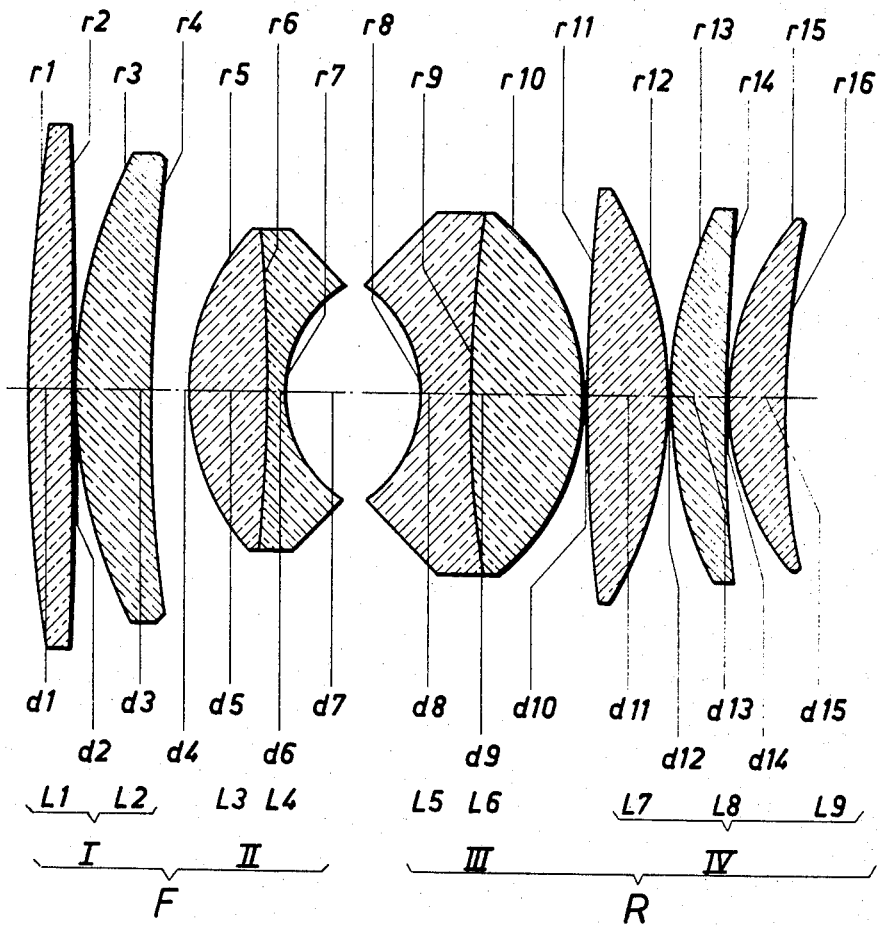

3,472,576
HIGH-SPEED PHOTOGRAPHIC OR CINEMATO-GRAPHIC OBJECTIVE
Werner Wagner, Odernheim (Glan), Germany, assignor to Jos. Schneider & Co., Bad Kreuznach, Rhineland, Germany a corporation of Germany
Filed Sept. 8, 1967, Ser. No. 666,420
Claims priority, application Germany, Sept. 15, 1966, Sch 39,539
Int. Cl. G02b 9/00, 11/34
U.S. Cl. 350—176                                    10 Claims

ABSTRACT OF THE DISCLOSURE

Optical objective with a front lens group and a rear lens group separated by a diaphragm space, each group consisting of a negative component in the form of a doublet adjacent the diaphragm space and of a positive multi-lens component remote from that space, each doublet being composed of a biconcave lens next to the diaphragm space and a biconvex lens separated therefrom by a cemented surface which is positively refracting in the case of the front doublet and negatively refracting in the case of the rear doublet, the positive front component consisting of a biconvex first singlet and a second singlet in the form of a positive meniscus with rearwardly facing concavity, the positive rear component consisting of a biconvex third singlet immediately following the rear doublet and two further singlets in the form of positive menisci with rearwardly facing concavities.

---

My present invention relates to a high-speed optical objective for photographic or cinematographic cameras, of the Gaussian type wherein a diaphragm space is bounded by the concave surfaces of two meniscus-shaped negative lens members which in turn are bracketed by positive lens members.

The general object of this invention is to provide an objective of this structure designed to operate with a large angle of view, upwards of 35°, at aperture ratios as high as 1:0.75 and with substantial suppression of spherical zonal aberrations as well as maintenance of sufficient illumination at the corners of the projected image, the back-focal length of the objective advantageously exceeding 60% of the overall focal length. A system satisfying these requirements is useful not only for ordinary photographic purposes but also for television and X-ray photography.

I have found in accordance with the present invention that the foregoing object can be satisfied, with obtention of high-quality images, by the provision of an objective of the character set forth whose front lens group consists of a positive first component in the form of two positively refractive singlets and a negative second component in the form of a doublet, the rear lens group of the objective similarly consisting of a negative third component in the form of a doublet and of a positive fourth component in the form of three air-spaced singlets; each doublet is composed of a biconvex and a biconcave lens, the latter adjoining the diaphragm space and being separated from its mate by a cemented surface which is positively refractive in the case of the second component and negatively refractive in the case of the third component. The first singlet is biconvex, as is the third singlet which constitutes the first member of the fourth component; the remaining lenses, i.e. the second singlet of the first component and the fourth and fifth singlets included in the fourth component, are positively refractive menisci with rearwardly facing concavities.

The following relationships should be observed for optimum performance:

(a) The focal length $f_F$ of the front group should be greater than 8 times the focal length $f_R$ of the rear group. More specifically, I prefer to make $14 f_r > f_F > 12 f_R$.

(b) The magnitude of $f_R$ should be less than 0.3 times the individual focal length $f_I$ of the first component, the preferred range being $4 f_R < f_I < 6 f_R$.

(c) The individual focal length $f_{II}$ of the second component should have an absolute value which is less than $4f$ ($f$ being the overall focal length of the system) and which preferably is approximately equal to $f_I$.

(d) The individual focal length $f_{III}$ of the third component should have an absolute value which is also less than $4f$ and preferably is approximately equal to $\frac{3}{4} f_I$.

(e) The axial thickness of the positive constituent of the rear doublet should be greater than 0.4 times the radius of curvature of the rear surface of that constituent.

(f) The sum of the radii of curvature of the front surfaces of the third, fourth and fifth singlets should be less than 40% of the sum of the radii of curvature of the rear surface of the first and second singlets.

(g) The radii of curvature of the front surfaces of the third, fourth and fifth singlets should be progressively smaller.

(h) The sum of the absolute values of the refractive powers of the concave surfaces of the two doublets, confronting the diaphragm space, should be greater than 1.7 times the sum of the refractive powers of the convex surfaces of these doublets remote from the diaphragm space.

(i) The sum of the radii of curvature of the concave surfaces bounding the diaphragm space should be less than the sum $\Sigma d_R$ of the thicknesses and separations of all the lenses of the rear group.

(j) The radius of curvature of the concave surface of the rear doublet should be less than half the aforementioned sum $\Sigma d_R$, being preferably approximately equal to the radius of curvature of the confronting concave surface of the front doublet.

(k) The difference between the refractive indices of the biconcave lenses of the rear and front doublets should be greater than 0.15.

(l) The arithmetic mean of the refractive indices $n_d$ of all positive lenses of the system should be less than 0.65.

(m) The difference between the arithmetic mean of the Abbe numbers $\nu(+)$ of all positive lenses and the arithmetic mean of the Abbe numbers $\nu(-)$ of all negative lenses should range between 15 and 25.

An objective satisfying the foregoing requirements will perform with a minimum of aberrations, and with a luminosity at the corners equaling about two-thirds that at the center, over an angle of view up to 35° and with a relative aperature up to 1:0.75.

More particularly, conditions (a)–(d) insure a back-focal length greater than $0.6f$; condition (e) limits the spherical aberrations in the image plane to less than $0.001f$; conditions (f) and (g) reduce the distortion for the larger angles of incidence to less than 1% and favor the flattening of the astigmatic image shells; conditions (h)–(j) establish a Petzval sum of about $0.006f$, with condition (j) particularly effective in suppressing coma; conditions (k)–(m) insure an excellent correction of chromatic aberrations.

The sole figure of the accompanying drawing illustrates an objective according to my invention.

The objective shown in the drawing comprises a front lens group F, consisting of a positive first component I and a negative second component II, and a rear lens group R, consisting of a negative third component III and a positive fourth component IV. Component I consists of a first singlet L1 of biconvex shape, having radii r1, r2 and thickness d1, followed by a second singlet L2 in the form of a positive meniscus which is separated from singlet L1 by an air space d2 and has radii r3, r4 and thickness d3. Component II, separated from lens L2 by an air space d4, is a doublet composed of a biconvex lens L3 (radii r5, r6 and thickness d5) and a biconcave lens L4 (radii r6, r7 and thickness d6), its more strongly curved rear surface r7 bounding a diaphragm spaced d7 which is also bounded by the more strongly curved front surface r8 of a biconcave lens L5 of thickness d8 that is cemented by its rear surface r9 onto a biconvex lens L6 having a thickness d9 and a rear radius r10. The doublet L5, L6, constituting the component III, is followed after an air space d10 by a third singlet L7 (radii r11, r12 and thickness d11) of biconvex shape, a meniscus-shaped fourth positive singlet L8 (radii r13, r14 and thickness d13) and a similarly shaped fourth positive singlet L9 (radii r15, r16 and thickness d15), the lenses L7, L8, L9 component IV being separated by intervening air spaces d12 and d14. All the positive menisci L2, L8 and L9 turn their concavities rearwardly, i.e. toward the image side of the system. The cemented surface r6 of doublet II is positively refracting, in contradistinction to the negatively refracting cemented surface r9 of doublet III.

In the following table, I have listed representative values for the parameters r1–r16 and d1–d15 of the system shown in the drawing, together with the refractive indices $n_d$, the Abbe numbers $\nu$ and the surface power $\Delta n/r$ of lenses L1–L9, the system so defined having an aperture ratio of 1:0.75, an image angle of 35°, and a back-focal length of 68.42 units of length based on an overall focal length $f=100$ units (e.g. mm.).

TABLE

| Lens | | Radii | Thicknesses and Separations | $n_d$ | $\nu$ | $\Delta n/r$ |
|---|---|---|---|---|---|---|
| I | L1 | r1=+696.68 | d1 = 16.51 | 1.51978 | 51.9 | +0.00074608 |
| | | r2=−2309.16 | d2 = 0.40 air space | | | +0.00022509 |
| | L2 | r3=+185.20 | d3 = 28.10 | 1.51978 | 51.9 | +0.00280652 |
| | | r4=+836.41 | d4 = 13.76 air space | | | −0.00062144 |
| II | L3 | r5=+87.02 | d5 = 28.49 | 1.68584 | 47.9 | +0.00788133 |
| | L4 | r6=−675.06 | d6 = 7.46 | 1.62075 | 52.3 | +0.00009642 |
| | | r7=+46.14 | d7 = 50.90 diaphragm space | | | −0.01345250 |
| III | L5 | r8=−47.56 | d8 = 18.67 | 1.85504 | 23.6 | −0.01797859 |
| | L6 | r9=+414.82 | d9 = 42.45 | 1.73692 | 50.8 | −0.00028475 |
| | | r10=−84.78 | d10= 0.40 air space | | | +0.00869210 |
| IV | L7 | r11=+613.55 | d11= 30.85 | 1.62287 | 60.1 | +0.00101519 |
| | | r12=−146.65 | d12= 0.40 air space | | | +0.00424743 |
| | L8 | r13=+156.47 | d13= 20.63 | 1.58990 | 68.0 | +0.00376999 |
| | | r14=+854.49 | d14= 0.40 air space | | | −0.00069036 |
| | L9 | r15=+99.01 | d15= 22.60 | 1.58990 | 68.0 | +0.00595805 |
| | | r16=+302.96 | Σd=282.02 | | | −0.00194711 |

The numerical values of the foregoing table are to be understood as valid within tolerance limits of substantially ±10% for the thicknesses and separations d1–d15, the surface powers $\Delta n/r$ and the Abbe numbers $\nu$ and of substantially ±0.02 for the refractive indices $n_d$ given for a reference wavelength of 587.6 microns. In view of these tolerances, the decimals given in the table are only of minor significance, except in the case of fractional values.

The described objective has the following individual focal lengths for its first three components and its front and rear lens groups:

$$f_I = +314.56$$
$$f_{II} = -312.31$$
$$f_{III} = -240.43$$
$$f_F = +780.63$$
$$f_R = + 60.44$$

These values satisfy the above-stated conditions (a)–(d). Furthermore, $d9 \approx 0.5 r10$ which satisfies condition (e). Also, $r11+r13+r15=869.3$ whereas $$r2+r4=3145.57$$

satisfying condition (f); also, $r11>r13>r15$ in accordance with condition (g). The absolute values of the refractive powers of surfaces r7 and r8 add up to 0.0314 whereas the sum of the refractive powers of surfaces r5 and r10 equals 0.0166, satisfying condition (h). With $r7 \approx r8$ and $\Sigma d_R=136.4$, conditions (i) and (j) are also met. Furthermore, the refractive indices $n_d$ of lenses L5 and L4 differ by 0.23, the arithmetic mean of all the $n_d$ values is 1.6067, the arithmetic means of the Abbe numbers $\nu(+)$ of all positive lenses L1–L3 and L6–L9 is 57 and the arithmetic means of the Abbe numbers $\nu(-)$ of the negative lenses L4, L5 is 38, thus satisfying conditions (k), (l) and (m).

I claim:
1. An optical objective with a front lens groups and a rear lens group separated by a diaphragm space, said front lens group consisting of a positively refracting first component followed by a negatively refracting second component, said rear lens group consisting of a negatively refracting third component followed by a positively refracting fourth component, said second and third components being doublets each composed of a biconcave lens adjoining said diaphragm space and a biconvex lens separated therefrom by a cemented surface, the cemented surface of said second component being positively refracting and the cemented surface of said third component being negatively refracting, said first component being composed of a biconvex first singlet followed by a second singlet in the form of a positive meniscus with rearwardly facing concavity, said fourth component being composed of a biconvex third singlet followed by a fourth and a fifth singlet each in the form of a positive meniscus with rearwardly facing concavity.

2. An object as defined in claim 1 wherein said front lens group has a focal length greater than eight times the focal length of said rear lens group, both said focal lengths being positive, the focal length of said rear lens group being less than 0.3 times the individual focal length of said first component.

3. An object as defined in claim 2 wherein the focal length of said front lens group ranges between 12 and 14 times the focal length of said rear lens group.

4. An object as defined in claim 3 wherein the absolute values of the individual focal lengths of said first and second components are substantially alike and approximately equal to four-thirds that of said third component.

5. An object as defined in claim 3 wherein the individual focal lengths of said first component ranges between four and six times the focal length of said rear lens group.

6. An object as defined in claim 3 wherein the individual focal length of said second component has an absolute value ranging between four and six times the focal length of said rear lens group.

7. An object as defined in claim 3 wherein the individual focal length of said third component has an absolute value ranging between three and five times the focal length of said rear lens group.

8. An objective as defined in claim 2 wherein the biconvex lens of said third component has an axial thickness greater than 0.4 times the radius of curvature of the rear surface thereof, the sum of the radii of curvature of the front surfaces of said third, fourth and fifth singlets being less than 40% of the sum of the radii of curvature of the rear surfaces of said first and second singlets, the radius of curvature of the front surface of said fourth singlet being shorter than that of the front surface of the third singlet but longer than that of the front surface of said fifth singlet, the sum of the absolute values of the refractive powers of the concave surfaces of said doublets confronting said diaphragm space being greater than 1.7 times the sum of the refractive powers of the convex surfaces of said doublets remote from said diaphragm space, the sum of the radii of curvature of said concave surfaces being less than the sum of the thicknesses and separations of the lenses of said rear lens group, the latter sum being greater than twice the radius of the concave surface of said third component, the refractive index of said biconvex lens of said third component exceeding by at least 0.15 the refractive index of said biconcave lens of said second component, the arithmetic mean of the refractive indices of all positive lenses of the objective being less than 1.65, the difference between the arithmetic mean of the Abbe numbers of all positive lenses and the arithmetic mean of the Abbe numbers of all negative lenses of the objective ranging between 15 and 25.

9. An objective as defined in claim 8 wherein the radii of curvature of said concave surfaces have substantially the same length, the focal length of said front lens group ranging between 12 and 14 times the focal length of said rear lens group, the absolute values of the individual focal lengths of said first and second components being substantially alike and approximately equal to four-thirds that of said third component, the individual focal length of said second and third components having an absolute value ranging between 4 and 6 times the focal length of said rear lens group.

10. An objective as defined in claim 9 wherein said first singlet L1, said second singlet L2, said biconvex lens L3 and said biconcave lens L4 of said second component, said biconcave lens L5 and said biconvex lens L6 of said third component, said third singlet L7, said fourth single L8 and said fifth singlet L9 have radii of curvature $r1$ to $r16$ and thickness and separations $d1$ to $d15$ whose numerical values, based upon a numerical value of 100 for the overall focal length, along with the refractive indices $n_d$ and the Abbe numbers $\nu$ thereof are substantially as given in the following table:

| Lens | Radii | Thicknesses and Separations | $n_d$ | $\nu$ |
|---|---|---|---|---|
| L1 | $r1=+697$ | $d1=17$ | 1.52 | 52 |
|    | $r2=-2309$ | $d2=0.4$ | air space | |
| L2 | $r3=+185$ | $d3=28$ | 1.52 | 52 |
|    | $r4=+836$ | $d4=14$ | air space | |
| L3 | $r5=+87$ | $d5=28$ | 1.69 | 48 |
| L4 | $r6=-675$ | $d6=7$ | 1.62 | 52 |
|    | $r7=+46$ | $d7=51$ | diaphragm space | |
|    | $r8=-48$ | | | |
| L5 | | $d8=19$ | 1.86 | 24 |
|    | $r9=+415$ | | | |
| L6 | $r10=-85$ | $d9=42$ | 1.74 | 51 |
|    | $r11=+614$ | $d10=0.4$ | air space | |
| L7 | | $d11=31$ | 1.62 | 60 |
|    | $r12=-147$ | $d12=0.4$ | air space | |
|    | $r13=+156$ | | | |
| L8 | $r14=+854$ | $d13=21$ | 1.59 | 68 |
|    | $r15=+100$ | $d14=0.4$ | air space | |
| L9 | $r16=+303$ | $d15=23$ | 1.59 | 68 |

References Cited

UNITED STATES PATENTS 2,481,639   9/1949   Altman et al. _____ 350—210

DAVID SCHONBERG, Primary Examiner

P. A. SACHER, Assistant Examiner

U.S. Cl. X.R.

350—214